G. KELLY.
SAW FILING ATTACHMENT.
APPLICATION FILED AUG. 16, 1909.
1,002,280.
Patented Sept. 5, 1911.
2 SHEETS—SHEET 1.
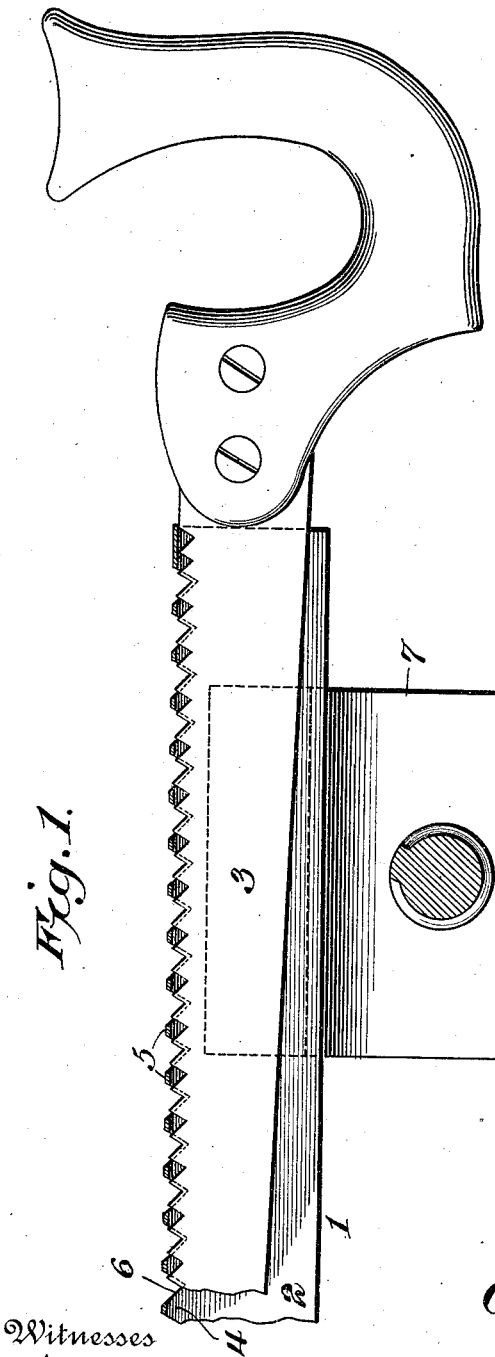
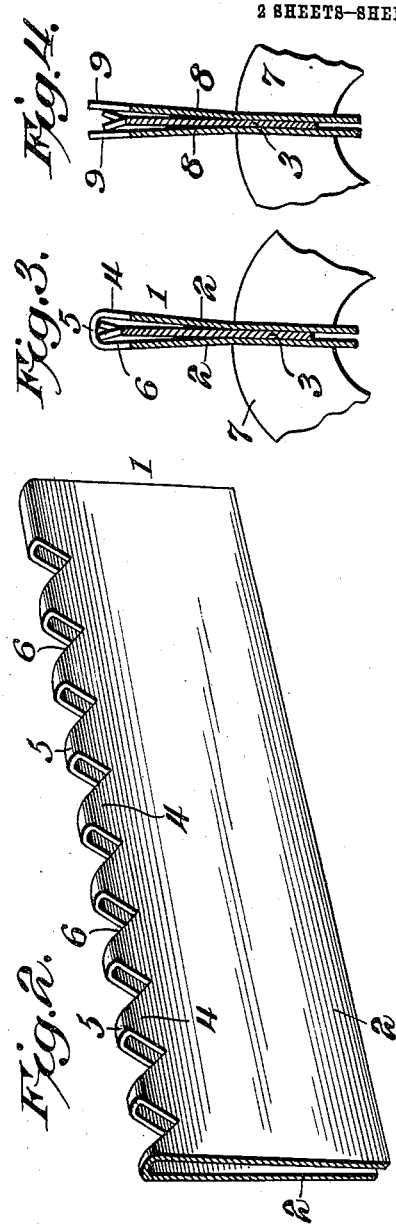
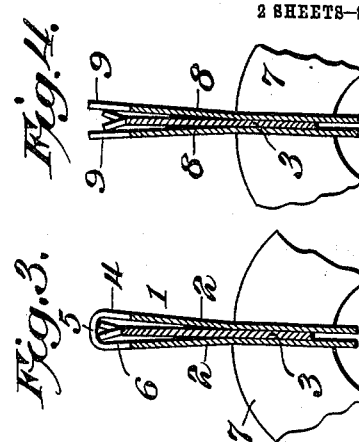
George Kelly, Inventor, G. KELLY.
SAW FILING ATTACHMENT.
APPLICATION FILED AUG. 16, 1909.
1,002,280.
Patented Sept. 5, 1911.
2 SHEETS—SHEET 2.
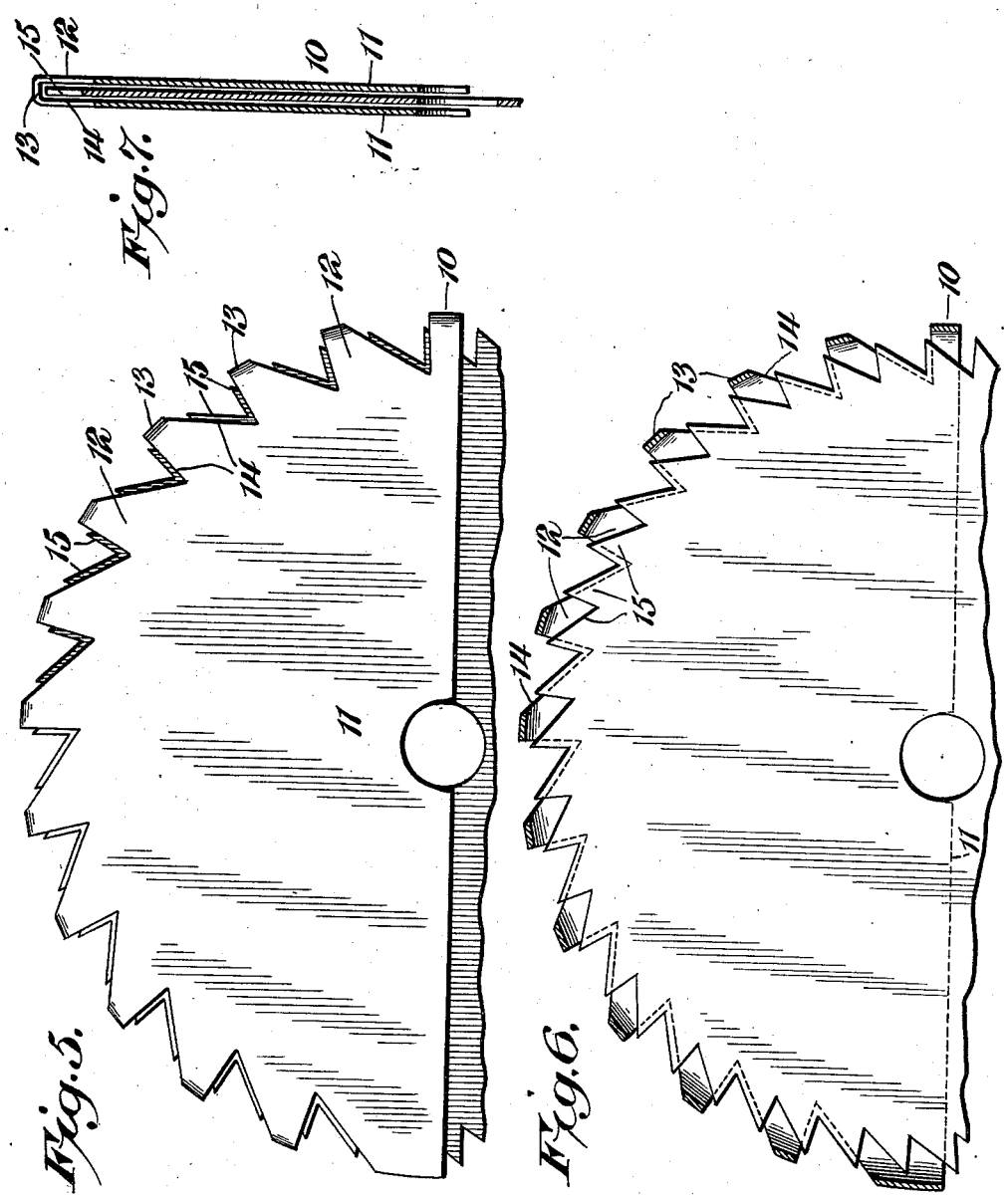
Witnesses
Howard D. Ort.
H. T. Riley
George Kelly, Inventor,
By E. G. Siggers
Attorney

UNITED STATES PATENT OFFICE.

GEORGE KELLY, OF HINSDALE, ILLINOIS.

SAW-FILING ATTACHMENT.

1,002,280. Specification of Letters Patent. Patented Sept. 5, 1911.

Application filed August 16, 1909. Serial No. 513,138.

*To all whom it may concern:*

Be it known that I, GEORGE KELLY, a citizen of the United States, residing at Hinsdale, in the county of Dupage and State of Illinois, have invented a new and useful Saw-Filing Attachment, of which the following is a specification.

The invention relates to a saw filing attachment.

The object of the present invention is to provide a simple, durable and practical saw filing attachment of inexpensive construction, designed for various kinds of saws either straight or circular, and adapted to be conveniently carried in the tool kit of a carpenter or other mechanic, and capable of being readily applied to a saw and of affording a guide for the file and a protector and guide for the saw to enable a saw to be rapidly and accurately sharpened without liability of spoiling the same by filing the wrong teeth.

A further object of the invention is to provide a saw filing attachment, which, when applied to a saw blade, will expose each alternate recess and cover the intervening recesses, and thereby permit the file to enter only the proper recess and which when shifted along the saw blade the distance of one tooth will expose the previously guarded recesses and cover the recesses in which the file has been used, whereby only the proper cutting edge of every other tooth will be filed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a longitudinal sectional view of a saw filing attachment, constructed in accordance with this invention, and shown applied to a saw, the latter being shown in elevation. Fig. 2 is a perspective view of a portion of the saw filing attachment. Fig. 3 is a transverse sectional view, the parts being arranged as shown in Fig. 1. Fig. 4 is a similar view, illustrating another form of the invention in which the sides of the device are made in separate pieces. Fig. 5 is a side elevation of another form of the invention, showing the saw filing attachment applied to a circular saw. Fig. 6 is a longitudinal sectional view of the same. Fig. 7 is a transverse sectional view.

Like numerals of reference designate corresponding parts in all the figures of the drawings.

In the embodiment of the invention illustrated in Figs. 1 to 3 inclusive of the drawings, the saw filing attachment 1 is composed of two similar sides 2, spaced apart to receive a saw blade 3 between them and connected at the top by integral tapered guards 4, composed of approximately triangular side portions and a top connecting portion 5. The tapered guards, which cover and protect the cutting edge of each alternate saw tooth, extend over the alternate intervening recesses between the saw teeth and guard the same and prevent the file from entering the wrong recess, whereby the filing of the proper saw tooth is assured. The intervening V-shaped recesses 6 between the guards 4 are downwardly tapered and correspond with the shape of the recesses between the saw teeth, the front and rear edges of the tapered guards being inclined similarly to the front and rear edges of the saw teeth.

The tapered recesses 6 of the saw filing attachment are of slightly greater size than the intervening recesses between the saw teeth, in order to expose completely the saw at the said recesses to enable the exposed cutting edges of the teeth to be filed with the same facility as when a saw filing attachment is not employed. This result is secured by making the guards 4 at their outer portions less in width lengthwise of the saw than the width of the outer portions of the tapered recesses 6, which recesses separate the guards from each other, so that the guards, while closing the space between each alternate pair of teeth, and thus preventing the file from entering therein, yet leave enough of the teeth exposed to effect the filing operation. The front cutting edge of one tooth and the back edge of the next adjacent tooth are exposed at each recess of the saw filing attachment, so that one side of two teeth may be sharpened at the same time.

The saw filing attachment is placed over a saw blade with its upper end or end adjacent to the handle of the saw arranged at one tooth or cutting edge, and the saw and the attachment are clamped in a vise 7, or other suitable holding means. The exposed cutting edges of the teeth are filed, and when the exposed set of teeth are sharpened, the saw is reversed in the vise and the saw filing attachment is moved longitudinally of the saw blade the distance of one tooth to carry its inner or upper end to the next tooth from the position previously occupied by it. This exposes the other set of saw teeth and the cutting edges thereof may be filed. The reversal of the saw enables the file to be used in the customary manner with the operator standing at the front of the vise. The angle and the depth of the teeth of saws vary greatly, and under some circumstances I make the attachments in rights and lefts, by providing the recesses 6 with either a right hand bevel or a left hand bevel. In this way it would take two separate attachments to complete the filing of the saw. After one attachment had been used it would be removed and the other put in place. It is not always necessary to clamp the attachment to the saw by the vise which supports the saw. Frequently, it is only sufficient to drop the attachment over the teeth of the saw and it will hold itself in position by its own weight.

The saw filing attachment may be made of a length to extend along the entire blade of a saw, or it may be constructed of a length less than the saw blade, and may be shifted along the same to enable the different portions of a saw to be successively sharpened. Also the saw filing attachment, as illustrated in the embodiment of the invention shown in Fig. 4, may be constructed of two separate plates or members 8 provided at their upper edges with corresponding tapered guards 9 and intervening tapered recesses. The separate plates or members 8 may be firmly clamped against the opposite faces of a saw blade by the jaws of the vise, as shown, and the projecting tapered guards will cover and protect one set of the cutting edges of a saw and expose the other set.

The guards and intervening recesses of the attachment may be made of any size and angle to correspond with the teeth of the saw to be sharpened, and they may be cast or otherwise formed of any suitable material. Also the saw filing attachment is applicable to circular saws as well as those having straight cutting edges.

In Figs. 5 to 7 inclusive of the drawings is illustrated a substantially semi-circular saw filing attachment 10, composed of spaced sides 11 provided at their peripheral edges with tapered guards 12, which are connected at their outer ends by integral transverse portions 13. The tapered guards 12, like those heretofore described, cover the cutting edges of one set of teeth and expose the cutting edges of the alternate teeth, the intervening recesses 14 between the tapered guards being slightly greater in size than the recesses between the saw teeth 15 to completely expose the edges at the recess in which the file is placed.

The saw filing attachment for circular saws guards and protects the cutting edge in the same manner as the saw filing attachment for saws having straight edges, and they may be variously constructed so as to enable half of the saw to be operated on or a less portion thereof. In each form of the saw filing attachment employing the outer transverse connecting portions 5 of the guards, the device acts in a dual capacity, as it not only guards and protects every other tooth, but it also protects the operator and prevents the hands from coming in contact with the cutting edge of the saw.

Having thus fully described my invention, what I claim as new and desire to secure by Letters Patent, is:—

1. A saw filing attachment comprising a flat plate or member adapted to fit along a side of a saw blade and form both a guard and guide for the teeth and file respectively within the limits of the length of the attachment, and provided at its outer edge with a plurality of alternating spaced guards and recesses, the guards being narrower in width at their outer portions lengthwise of the saw than the width of the outer portions of the recesses so as to close every alternate space separating the teeth of the saw blade and leave the spaces between the other teeth exposed.

2. A saw filing attachment comprising a flat plate or member composed of two sides spaced apart to receive a saw blade between them and form both a guard and guide for the teeth and file, respectively, within the limits of the length of the attachment, and provided at its outer edge with a plurality of alternating spaced guards and recesses, which are reversely tapered, the walls of the recesses defined by the front and rear edges of the guards being inclined to accord with the inclination of the saw teeth, said guards decreasing in width lengthwise of the saw from their inner to their outer portions while the recesses increase in width from their inner to their outer portions, the width of the outer portions of the guards being less than the width of the outer portion of the recesses, whereby each alternate space separating the teeth of the saw blade is closed by the guards leaving the spaces between the other teeth exposed.

3. A saw filing attachment comprising a plate or member composed of two sides spaced apart to receive a saw blade between them and embrace the saw teeth within the limits of the length of the attachment, said sides being adapted to bear against the sides of the saw blade when the latter and the attachment are placed in a vise so as to hold the two in associated relation during the filing operation, said plate or member being provided along its outer edge with a plurality of alternating spaced guards and recesses formed in each side, the guards and recesses of one side being in alinement with the guards and recesses of the other side, the recesses being V-shaped and the guards being composed of triangular side portions and an outer transverse connecting portion, said guards having their outer portions lengthwise of the saw narrower than the outer portions of the recesses so as to close each alternate space separating the teeth of the saw blade and leave the spaces between the other teeth exposed, the front cutting edge of one tooth and the rear cutting edge of the next adjacent tooth being exposed at each recess, whereby one side of two teeth may be sharpened at the same time.

In testimony, that I claim the foregoing as my own, I have hereto affixed my signature in the presence of two witnesses.

GEORGE KELLY.

Witnesses:
E. C. HALL,
EDYTHE HALL.

Copies of this patent may be obtained for five cents each, by addressing the "Commissioner of Patents, Washington, D. C."